United States Patent Office 3,033,798
Patented May 8, 1962

3,033,798
ACTIVATION OF CLAY BY ACID TREATMENT, OIL AGING AND CALCINATION
James V. Weir, Milltown, and Alfred J. Robinson, South Plainfield, N.J., assignors to Minerals & Chemicals Philipp Corporation, Menlo Park, N.J., a corporation of Maryland
No Drawing. Continuation of application Ser. No. 499,515, Apr. 5, 1955. This application Sept. 2, 1960, Ser. No. 53,625
7 Claims. (Cl. 252—450)

The present invention relates to an improved method of preparing active contact masses from clays (particularly kaolin clays), which masses are especially useful as catalysts in processes for cracking petroleum hydrocarbons to make gasoline. In essence, the invention is in the nature of an improvement over the method disclosed in the copending U.S. application of Serial No. 490,128, filed February 23, 1955, now Patent No. 2,967,157, which application was filed by the inventors of the subject application.

It is a recognized fact that kaolin, because of certain inherent characteristics and its ready availability, is potentially a very desirable starting material for catalyst manufacture. However, prior to discovery of the process claimed in the above-mentioned copending patent application, no economically feasible method for converting kaolin clays to commercially acceptable cracking catalysts had been found although much work had been done in attempts to develop such a method.

To be acceptable, a cracking catalyst should possess adequate activity and hardness and it should exhibit satisfactory catalyst life while in service. Methods of testing for evaluation of these properties will be described in examples hereinafter. The reason for needing good cracking activity in a catalyst is self-evident and hardness is important in that it combats attrition of the catalyst particles during their utilization. Attrition is detrimental since it results in loss of active catalyst as fines, carried out in the effluent vapor stream, and consequently increases the operating cost. Catalyst life, as the name implies, simply refers to the period of economic usefulness of a catalyst in service.

Catalysts made by the process of the present invention are useful in all of the known catalytic cracking processes and particularly suitable for use in either fixed bed or moving bed cracking operations. In fixed bed cracking, the hydrocarbon vapors are passed through a stationary bed of catalyst particles, while in moving bed cracking processes, as exemplified by Thermofor catalytic cracking (T.C.C) and Houdriflow operations, the catalyst particles gravitate towards the base of the reactor from whence they are conveyed through regenerators and back to the top of the reaction zone for another pass therethrough. The Houdriflow process differs from the T.C.C. one in the manner of conveying regenerated catalyst particles for recirculation to the reactor, a gas lift being used in the former case and elevators in the latter. Catalyst particles for fixed and moving bed processes are relatively coarse, ranging in size from about 10 mesh to about 4 mesh, and usually in the form of pellets or "beads."

It has been known for some time that sub-bentonite can be acid activated rather easily by so-called "wet" procedures in which the clay is treated with acid, usually sulfuric, and the resulting soluble salts then leached therefrom with water. It has also been known that wet acid activation is applicable to kaolin but with less success than is the case with sub-bentonite. Wet acid activation produces changes of both crystal structure and chemical composition in clays since alumina is removed from the said clays in the process.

As previously stated, many unsuccessful attempts to find a commercially acceptable process for converting kaolin clays to cracking catalysts had been made prior to discovery of the process claimed in the aforementioned copending patent application. For the most part, these attempts have entailed wet acid activation, as identified above, and modifications thereof as well as hardening treatments, the best known of which is calcination. The process disclosed in the said copending application, over which the present invention is an improvement, comprises a novel "dry" method of producing cracking catalysts from kaolin clays. Briefly, the method involves reacting kaolin with sulfuric acid and then calcining the reactant mixture to drive off volatiles, principally oxides of sulfur. This method is a dry one only in the sense that no washing or leaching step of the acid-treated clay is involved. Water can be added to the system for purposes other than leaching (as for example to improve the workability of the mix) within the scope of the invention. Hereinafter, this process for preparing catalysts from kaolin will be referred to as the "dry process."

An important element of the dry process has been disclosed to be an "aging" of the clay and acid (after their admixture) under such conditions as to promote substantial reaction between the two. For best results, according to the copending dry process application, the aging step should be carried out at elevated temperatures (from about 220° to about 325° F.) and with the clay-acid mass "protected from the atmosphere" to prevent any significant change in its moisture content, such change having a deleterious effect on the hardness of the final product. It is made clear in the said copending application that the phrase "protected from the atmosphere" denotes enclosure of the clay-acid mixture in a closed bin or the like.

It has been postulated that the dry process produces changes in the clay structure more or less along the following lines:

(1) The sulfuric acid reacts with aluminum and oxygen atoms in the clay to form aluminum sulfate, hydrates of aluminum sulfate, and water.

(2) Upon calcination, the aluminum sulfate decomposes to yield aluminum oxide and oxides of sulfur, the latter passing off as vapor.

(3) Composition-wise, the final product is equivalent to the starting clay since the dry process treatment simply results in the removal of aluminum oxide from the kaolinite lattice during its reaction with acid and the redeposition of aluminum oxide within the lattice during subsequent calcination. With respect to catalytic properties, however, the final product is greatly superior to the original clay, leading to the conclusion that the dry process, in effect, brings about displacement of aluminum oxide within the clay structure to positions more conducive to catalytic utility of the product.

Discovery of the dry process has opened the door to possible exploitation of kaolin clay for cracking catalyst purposes. We have now discovered a novel way of carrying out the aging step in the dry process, which makes for further improvement in the catalytic properties of the final product.

It is one object of the present invention to provide a novel method for preparing cracking catalysts from kaolin clays.

It is another object of the invention to provide a method of converting kaolin clays to cracking catalysts which does not include a troublesome water leaching step.

It is still another object of the invention to provide a method for converting kaolin clays to cracking catalysts which obviates such loss of clay weight as attends processes involving wet acid activation.

Still another object of the invention is to provide a practical method for obtaining cracking catalysts from kaolin, which catalysts are superior to those obtained by the dry process of our copending application.

Other objects and features of the invention will be apparent from the description and examples thereof which follow.

As previously noted, the process of the present invention is intended primarily for use on kaolin clays, by which is meant those naturally occuring clays containing kaolinite as the chief mineral constituent. The approximate chemical composition of kaolinite is represented by the formula: $Al_2O_3 \cdot 2SiO_2 \cdot 2H_2O$. The weight ratio of $SiO_2$ to $Al_2O_3$, indicated by this formula, is 1.18 and kaolin clays normally possess $SiO_2/Al_2O_3$ ratios of from 1.0 to 1.5.

There are numerous embodiments of the dry process as covered in the aforesaid copending patent application but almost all consist of mixing, forming, aging and calcining steps. The term "mixing step" refers to the mixing of kaolin clay and sulfuric acid; "forming step" to the formation of shaped particles from the clay-acid mixture; the "aging step" has previously been discussed; and by "calcining step" is meant calcination of the clay-acid reactant mass to decompose the aluminum sulfate therein. The sequence of these various operations can vary within the scope of the dry process concept, as pointed out in the copending patent application thereon, but the preferred sequence is the same as that given above in which the forming step precedes the aging one. In the aging step of the dry process, the time required for completion of the reaction depends to a certain extent on the temperature used. An example of a way of carrying out this step, which has proven satisfactory in many cases, consists of keeping the clay-acid mixture covered and holding it at a temperature of about 220° F. for a period of approximately 24 hours.

The present invention is the result of our discovery that aging the clay-acid mixture of the dry process in a hydrocarbon liquid, of the class hereinafter specified, results in a catalyst of good catalytic characteristics and effects improvement in catalytic properties of the final catalyst over those properties of catalysts made in the same fashion except employing simply dry process aging instead of the aforesaid oil aging step. Hydrocarbons acceptable for our improved process must be liquid at the temperature of aging and substantially nonreactive with sulfuric acid, although minor amounts of matter capable of reacting therewith can be tolerated. These hydrocarbons should preferably have low vapor pressures at the aging temperatures, but we do not wish to exclude the possibility of using lower boiling materials in conjunction with a condenser system to prevent loss of vapors. Examples of readily available hydrocarbon liquids which are suitable for our process are saturated aliphatic higher molecular weight hydrocarbons which have been treated with sulfuric acid for removal of sulfonatable components such as, for example, certain white mineral oils. Kerosenes can also be used as aging mediums in our process if condenser systems are available.

Possibly the superiority of oil aging (as in the process of the present invention) over air aging (as in the dry process) can be attributed in large part to two basic facts: (1) the oils have higher heat capacities than does air and (2) oil immersion is better protection against moisture change in the clay-acid mass than is enclosure in an air-filled space. The comparatively high heat capacities of oils useful in our improved process assure of much simpler and more reliable temperature control than is possible with air aging, especially in view of the fact that the clay-acid reaction is highly exothermic. An important advantage of our invention, not heretofore specifically mentioned, is that aging time is greatly reduced thereby. For instance, in the dry process aging periods of 24 hours are common, as previously indicated, whereas with our new oil aging technique, two to four hours usually suffice.

In putting the process of our invention into practice, kaolin clay and sulfuric acid are first mixed to an appearance of homogeneity in any apparatus suitable for the purpose, as for example, a pug mill. In the preferred embodiment of the process, the clay-acid mixture is extruded to form pellets, or otherwise shaped into masses within the desired size range, and the pellets or shaped masses are then immersed and aged in oil under such conditions of time and temperature as to bring about substantially complete reaction of clay and acid. After the aging step, the oil and solids are separated and the latter calcined to obtain the final product. There are many variations of procedure within the compass of our invention; for example, bead-type catalyst can be prepared by an embodiment of it in which a slip of the clay-acid mass is dropped or injected into hot oil with resultant formation of spheres which are then dried and aged therein.

While we prefer to use degritted raw clay (that which has been refined only to the extent that grit, foreign bodies and clots of undispersed clay have been eliminated) as a starting material in our process, we wish to have it clearly understood that the invention is not limited to the treatment of such a product. Clays which have received other preliminary treatments may still be amenable to processing in accordance with the teachings of our patent. Examples of preliminary treatments falling within this category are de-ironing by physical or chemical methods, conventional classifying operations and, even partial acid activation by the previously mentioned wet procedures. The volatile matter content (V.M.) of the starting clay should preferably not be so high as to make for too dilute a mixture of clay and acid for optimum handling under the conditions of the particular processing involved. We have obtained excellent results using a starting clay of about 14 percent V.M. with moderate dosages of concentrated sulfuric acid.

For our process, we prefer to use concentrated sulfuric acid, such as the commercially available Bé. (about 93 percent $H_2SO_0$) grade, adding water to the mix, if necessary, to improve its workability. However, any strength acid consistent with proper plasticity of mix for the dosage employed can be used within the scope of our invention. We prefer to use acid dosages from about 60 percent to about 100 percent in our process, acid dosage being defined as the weight of 100 percent acid per weight of volatile free clay expressed on a percentage basis. By volatile free clay is meant that which has been heated to essentially constant weight at about 1700° F. Although acid dosages much lower than 60 percent, down to as low as 20 percent in fact, can be used in our process with some benefit, the clay conversion gradually falls off with decreasing dosage until ineffectual levels are reached. With the lower dosages of acid, it has been found necessary to have higher water/acid ratios in the mix than will suffice for more normal dosages, the principal reason for this being to adjust the said mixes to conditions of optimum plasticity for working. When a 20 percent dosage is employed, for example, good plasticity is attainable with a dilute acid of only 50 percent $H_2SO_4$ concentration. On the other hand, higher acid dosage, particularly on a clay of relatively coarse particle size, sometimes produces a mixture too thin for adequate workability. In this event, the situation can frequently be remedied by either grinding the clay prior to acid addition or by substituting fuming sulfuric acid for the more dilute acid conventionally used. Although our preferred range of acid dosage has been given as that from about 60 percent to about 100 percent, dosages higher than 100 percent can be used within the scope of our invention, so long as a workable mix is obtainable in the process. Approximately 130 percent dosage represents the amount of acid that would be required for substantially complete reaction with an average kaolin clay.

As previously indicated, the kaolin clay and acid can be mixed and the resulting mixture formed into masses of appropriate sizes by any of the methods to accomplish these purposes well known to those skilled in the art. For example, the forming operation can be performed by extrusion, pilling, or injecting or dropping the clay-acid mixture into hot oil. For best results in extrusion, the V.M. of the mix should be between about 30 and 65 percent, with the preferred value being in the neighborhood of 50 or 55 percent.

The shaped masses are immersed in oil for the aging step. As stated previously, the oil used should be substantially nonreactive with sulfuric acid. By "substantially nonreactive," as used here and in the appended claims, is meant substantially nonreactive at the temperature of aging. We have experimentally determined that optimum temperatures for our oil aging step fall within the limits of from about 220° to about 400° F. and optimum times of aging within the range from 1 to 24 hours, with the time required depending on the temperature used. We prefer to age within the temperature range from 275° to 325° F. for from three to five hours. When aging temperatures become too high, the clay-acid reaction proceeds rapidly and the final product is excessively soft. When aging temperatures are too low, the product is also soft but in this case the cause seems to stem from insufficient reaction due to a very slow reaction rate. The oil bath may be static or circulating for purposes of our invention.

The calcining step of our process should be carried out preferably at a temperature and for a time to render the product substantially sulfate free. In most cases a temperature of from about 900° to about 1600° F., depending on the atmosphere, and a time of between 1 and 24 hours is sufficient. While we do not wish to exclude all calcination temperatures outside of the range stated, we would like to make clear that at temperatures much below 900° F. the aluminum sulfate decomposition is incomplete and that temperatures above 1600° F. manifest themselves in lowered surface area of the final product. The value of the surface area of a catalyst usually gives an indication of its activity; i.e., the greater the surface area, the greater the activity.

It is within the scope of our invention to incorporate not more than about 10 percent, on a total weight of mix basis, of a combustible filler into the clay-acid mixture of our process prior to formation of the said mixture into shaped masses. This filler, among other things, serves to increase the porosity of the final catalyst since it is eliminated during the calcination step leaving voids behind. Examples of fillers suitable for our purpose are wood flour, corn meal, sawdust, carbon and the like.

Following are examples included for purposes of illustration only and not to be construed as limiting the invention to any particular embodiments disclosed therein.

EXAMPLE I

This example illustrates the superiority of catalysts prepared on pilot plant scale from kaolin clay for the process of our invention over catalysts made from kaolin by the previously identified dry process.

The starting clay in the pilot plant operation of the present example was a water washed, pulverized Georgia kaolin clay of about 14 percent V.M. and having the following approximate analysis (V.F. basis):

| | Percent |
|---|---|
| $SiO_2$ | 52.10 |
| $Al_2O_3$ | 45.34 |
| $Fe_2O_3$ | 0.34 |
| $TiO_2$ | 2.22 |

During the operation of the pilot plant, which was run at a capacity of 10 tons per day of finished catalyst, the incoming clay was mixed with 66° Bé. (93.2 percent $H_2SO_4$) sulfuric acid and the resultant mixture was then fed to an auger mill which extruded it through a die plate. The extruded material was cut into short pieces (pellets) by cutter blades as it emerged from the die plate. The acid was added to the system through a perforated pipe which distributed it onto the feed clay upstream from the mixing apparatus, in proportion equivalent to a dosage of about 80 percent. The mixing apparatus consisted of a train of two paddle conveyors and a pugging section. The pellets were next dumped into percolation units to a depth of about 25 inches. White mineral oil was introduced into each unit beneath the bed of pellets and forced upward through the bed to an overflow pipe above the level of said bed. The pellets were kept immersed in the circulating oil bath for a period of four hours or a little longer, the time of immersion (aging) depending on the length of time required for the unreacted acid to be reduced in the pellets to an amount less than 10 percent of the total present. During aging, the oil bath was maintained at a temperature of about 300° F. by means of cooling and heating arrangements. The white mineral oil used in the aging baths was a product of Standard Oil Company of Kentucky, put out under the trade name Kyso 32. After the pellets in a percolation unit had aged the proper length of time, the oil was drained from the unit and the pellets removed therefrom.

Batches of the oil-aged catalyst pellets from the above-described pilot plant process were calcined in a rotary calciner for from 2 to 2½ hours at about 1500° F.

The calcined pellets were tested for hardness by a ball mill method and for conversion efficiency by the so-called 6.8 liter evaluation. In the former test, a sample of the catalyst pellets was separated into three fractions by screening through 3-mesh and 5-mesh sieves until about 200 grams of the 3/5 fraction was obtained. The 3/5 fraction was heat-treated at 1050° F. by passing bone dry air over it for three hours. The heat-treated material was poured into a tared 100 cc. graduate to the 80 cc. mark, with tapping to gently pack the particles. The weight of the 80 cc. of catalyst particles was determined and they were then placed in a stainless steel cylindrical container with four polished stainless steel ball bearings, each of $15/16$-inch diameter. The container was closed tightly and it was then rotated about its longitudinal axis at about 80 r.p.m., on a roller arrangement, for about one hour. After the rotation had ceased, the catalyst solids in the container were screened on an 8-mesh sieve and the hardness calculated as the percentage of total sample (i.e., the 80 cc.) weight represented by the plus-eight-mesh fraction of the final material.

The 6.8 liter evaluation is carried out in a fixed bed cracking unit with a catalyst capacity of 6.8 liters. Two cracking operations are performed in the unit, one using the catalyst to be tested and the other using the commercial sub-bentonite catalyst Filtrol 62 as a standard for comparison. The space rate necessary to achieve 55 percent volume conversion of the gas oil feed is determined for each of the catalysts and the ratio of the space rate of the tested catalyst to that of Filtrol 62, expressed as a percentage, is used as a measure of the conversion efficiency of the sample catalyst.

The catalyst pellets of this example were found to possess a hardness of 94 percent and a conversion efficiency of 160 percent. The hardness of the Filtrol 62 was determined to be 90 percent by the ball mill method outlined above.

Catalyst pellets made by the dry process from degritted Georgia kaolin clay of about 14 percent V.M. content were evaluated for hardness and conversion efficiency by the testing procedures described. The pellets were made with about the same acid dosage and acid concentration as the oil-aged ones of this example but they were prepared in the laboratory instead of a pilot plant and they contained 5 percent, V.F. clay weight basis, of an activated carbon as a filler. The sequence of steps in the preparation of the dry process pellets was the same as that for the oil-aged ones but the aging was accomplished in air at 220° F. instead of in oil. The time of aging was 24 hours; calcination was for six hours at 1500° F. The dry process catalyst pellets were found to have a hardness of 78 percent and a conversion efficiency of 136 percent.

For ready comparison the test results of this example are compiled in Table I:

*Table I*

|  | Dry Process | Oil Aging | Filtrol 62 |
|---|---|---|---|
|  | Percent | Percent | Percent |
| Ball mill hardness | 78 | 94 | 90 |
| Conversion efficiency | 136 | 160 | 100 |

Table I gives a clear illustration of the decided superiority of the pellets made according to our process over those made by the dry process, in both hardness and conversion efficiency. Moreover, the table shows that the catalyst of our invention was even harder than the commercial catalyst, Filtrol 62. The differences in hardness and catalytic conversion between our pellets and those made by the dry process are even more significant when it is considered that the latter pellets were made in a laboratory, where better control is possible (than in a pilot plant), and that a combustible filler was employed in their preparation, the use of such a filler in this manner giving increased porosity without adversely affecting the conversion efficiency of the catalyst. The times of aging and calcining the dry process pellets were 24 hours and 6 hours respectively as opposed to aging and calcining times of only about 4 hours and 2 to 2½ hours respectively for the oil-aged pellets.

EXAMPLE II

This example demonstrates further that our process produces a catalyst of high quality from kaolin clay. The kaolin clay used was a degritted Georgia kaolin of about 14 percent V.M. having the following chemical analysis (reported on a V.F. basis):

|  | Percent |
|---|---|
| $SiO_2$ | 45.42 |
| $Al_2O_3$ | 38.79 |
| $Fe_2O_3$ | 0.31 |
| $TiO_2$ | 1.59 |
| CaO | 0.35 |
| Alkali metal oxides | 0.15 |

A sample of the above-identified kaolin was pugged with an 89 percent dosage of sulfuric acid and a 5 percent dosage of activated carbon. The acid used was 66° Bé. grade. After the ingredients had been thoroughly mixed, the mixture was extruded and the extruded material cut into cylindrical-shaped pellets about 3/16-inch long and 3/16-inch in diameter.

Batches of the green pellets were aged in static oil baths at oil to pellet ratios of 1/1 and 2/1 respectively. The ratio represents the ratio at oil weight to green pellet weight. The oil used was a U.S.P. grade white mineral oil sold by The Atlantic Refining Company under the trade name Atreol 34. Aging time in each case was two hours and aging temperature was 280° F. at each oil ratio. After aging, the pellets were all calcined for six hours at 1500° F.

The calcined pellets of this example were tested for hardness by a modification of the so-called Union hardness test. Their surface areas were also evaluated. For the hardness test, a sample of the pellets was separated into three size fractions using 3-mesh and 5-mesh sieves as in the ball mill test described in Example I. Twenty-five grams of the 3/5 fraction of the pellets were placed in a Union hardness test cylinder along with eight steel balls of 5/8-inch diameter. The sealed cylinder containing the pellets and steel balls was rotated end-over-end for ten minutes at 18 r.p.m. and the contents were then discharged onto an 8-mesh screen. The pellet fragments were separated into plus-8-mesh and minus-8-mesh fractions and the hardness determined according to the formula:

$$\frac{\text{Wt. of plus-8-mesh}}{\text{Total wt. of both fractions}} \times 100 = \text{percent hardness}$$

The surface areas of the pellet batches were arrived at using the method described in an article by Brunauer, Emmett and Teller which appeared in J. Am. Chem. Soc. 60, 309–319 (1938). A cross-sectional area of 15.4 A.$^2$ for the nitrogen molecule was employed, as suggested by H. K. Livingston in J. Colloid Sci., 4, 447–458 (1949).

Hardness and surface area results on the pellets of this example are tabulated below:

*Table II*

| Oil/Pellet Ratio | Modified Union Hardness (Percent) | Surface Area (Square meters per gram, m.$^2$/g.) |
|---|---|---|
| 1/1 | 86 | 147 |
| 2/1 | 93 | 141 |

The test results above show that our process, incorporating the addition of a carbon filler, produced catalyst pellets of good hardness and surface area. By way of comparison, the surface area of the dry process pellets of Example I was found to be 93 m.$^2$/g. by the above-described Brunauer, Emmett and Teller method. Thus our process has been shown to produce a catalyst from kaolin clay of considerably higher surface area than one produced by the dry process from kaolin. The aging time for our oil-aged pellets was only 2 hours versus an aging time in the dry process of 24 hours.

EXAMPLE III

This example shows that our new process successfully converts kaolin clay to a material of good catalytic activity for subsequent petroleum cracking operations.

Batches of the oil-aged pellets of Example I (i.e., pellets which had been processed through the oil aging step) were calcined under the various conditions of time and temperature indicated in Table III and each batch was then evaluated for catalytic activity. Catalytic activity was evaluated by means of a so-called CAT-A test using a method described by J. Alexander and H. G. Shimp in an article on page R537 of National Petroleum News, Technical Section, August 2, 1944. In this method, a standard light East Texas gas oil is contacted at a rate of 5 cc. per minute for 10 minutes with 200 cc. of catalyst pellets at 800° F. The liquid product from the cracking test is collected at a temperature of 60° F. Catalytic activity is measured as the volume percent yield of gasoline on a no-loss basis (N.L.B. gasoline yield) and given as the volume of 410° F. endpoint gasoline distilled from the aforesaid cracked product, corrected for 100 percent recovery, expressed as a percentage of the volume of gas oil charged. As part of the CAT-A test, the weight of coke deposited on the catalyst, weight of gas produced and gas specific gravity are determined. The coke and gas weights are expressed as percentages of gas oil charged. Two CAT-A cycles are run with only the data from the second cycle being used since experience has shown these data to be sound.

The CAT-A results of this example are in Table III, below:

Table III

| Calcination Temperature, °F. | Calcination Time, Hours | N.L.B. Gasoline Yield, Percent | Coke, Percent | Gas, Percent | Gas Gravity |
| --- | --- | --- | --- | --- | --- |
| 1,500 | 1 | 28.4 | 4.4 | 6.6 | 1.05 |
| 1,500 | 2 | 27.4 | 4.2 | 8.0 | .90 |
| 1,500 | 4 | 31.8 | 4.4 | 7.3 | 1.00 |
| 1,600 | 1 | 28.2 | 4.3 | 6.3 | 1.01 |
| 1,600 | 2 | 29.9 | 4.0 | 6.8 | 1.04 |
| 1,600 | 4 | 31.6 | 3.6 | 6.5 | 1.00 |

The results in Table III show that our process produced a cracking catalyst from kaolin clay using the times and temperatures of calcination shown. Raw kaolin clay tested by the CAT-A method was found to produce an N.L.B. gasoline yield of only 10.9 percent and a gas by-product of 0.43 specific gravity. These results show that the use of raw kaolin as a cracking catalyst is completely out of the question, insofar as catalytic properties are concerned. Comparison of the raw clay data with those in Table III furnishes concrete proof that our process produces a catalyst showing commercially significant improvement in cracking properties (over those of the starting clay).

This application is a continuation of our copending application, Serial No. 499,515, filed April 5, 1955, and now abandoned.

We claim:

1. A method for the preparation of adsorptive contact masses from kaolin clay comprising mixing kaolin clay with from 60 percent to 125 percent by weight of sulfuric acid based on the volatile free weight of said kaolin clay; aging the resulting mixture for 1 to 24 hours in a hydrocarbon liquid, which is substantially nonreactive with sulfuric acid, at a temperature of from 220° F. to 400° F.; and then, without leaching out water soluble components from the resulting aged material, calcining said aged material at a temperature of from about 1400° F. to about 1600° F. for a time sufficient to substantially eliminate sulfate therefrom.

2. A method for the preparation of adsorptive contact masses from kaolin clay comprising mixing kaolin clay with from 60 percent to 125 percent by weight of sulfuric acid based on the volatile free weight of said kaolin clay; aging the resulting mixture for 1 to 24 hours in a white mineral oil at a temperature of from 220° F. to 400° F.; and then, without leaching out water soluble components from the resulting aged material, calcining said aged material at a temperature of from about 1400° F. to about 1600° F. for a time sufficient to substantially eliminate sulfate therefrom.

3. A method for the preparation of adsorptive contact masses in pellet form from kaolin clay comprising mixing kaolin clay with from 60 percent to 125 percent by weight of sulfuric acid based on the volatile free weight of said kaolin clay; forming the resulting mixture into pellets; aging said pellets for 1 to 24 hours in a hydrocarbon liquid, which is substantially nonreactive with sulfuric acid, at a temperature of from 220° F. to 400° F.; and then, without leaching out water soluble components from the aged pellets, calcining said aged pellets at a temperature of from about 1400° F. to about 1600° F. for a time sufficient to substantially eliminate sulfate therefrom.

4. A method for the preparation of adsorptive contact masses in pellet form from kaolin clay comprising mixing kaolin clay with from 60 percent to 125 percent by weight of sulfuric acid based on the volatile free weight of said kaolin clay; forming the resulting mixture into pellets; aging the said pellets for 1 to 24 hours in white mineral oil at a temperature of from 220° F. to 400° F.; and then, without leaching out water soluble components from the aged pellets, calcining said aged pellets at a temperature of from about 1400° F. to about 1600° F. for a time sufficient to substantially eliminate sulfate therefrom.

5. A method for the preparation of hydrocarbon cracking catalyst in pellet form from kaolin clay comprising mixing kaolin clay with from 60 percent to 125 percent by weight of sulfuric acid based on the volatile free weight of said kaolin clay; extruding the resulting mixture to form pellets; aging said pellets for 1 to 24 hours in a hydrocarbon liquid, which is substantially nonreactive with sulfuric acid, at a temperature of from about 275° F. to about 325° F.; and then, without leaching out water soluble components from the aged pellets, calcining said aged pellets at a temperature of from about 1400° F. to about 1600° F. for a period of from 1 to 10 hours to substantially eliminate sulfate therefrom.

6. A method for the preparation of adsorptive contact masses from kaolin clay comprising mixing kaolin clay with from 60 percent to 125 percent by weight of sulfuric acid based on the volatile free weight of said kaolin clay; aging the resulting mixture for 1 to 24 hours in a hydrocarbon liquid, which is substantially nonreactive with sulfuric acid, at a temperature of from 220° F. to 400° F.; and then, without washing out water soluble reaction products, calcining the reacted mixture at a temperature and for a time sufficient to substantially eliminate sulfate therefrom.

7. A method for the preparation of adsorptive contact masses in pellet form from kaolin clay comprising mixing kaolin clay with from 60 percent to 125 percent by weight of sulfuric acid based on the volatile free weight of said kaolin clay; forming the resulting mixture into pellets; aging said pellets for 1 to 24 hours in a hydrocarbon liquid, which is substantially nonreactive with sulfuric acid, at a temperature of from 220° F. to 400° F.; and then, without washing out water soluble reaction products, calcining said pellets at a temperature and for a time sufficient to substantially eliminate sulfate therefrom.

References Cited in the file of this patent

UNITED STATES PATENTS

| | | |
| --- | --- | --- |
| 2,485,626 | Mills | Oct. 25, 1949 |
| 2,631,983 | Milliken | Mar. 17, 1953 |